United States Patent [19]

Kano et al.

[11] Patent Number: 5,134,506
[45] Date of Patent: Jul. 28, 1992

[54] LIQUID CRYSTAL DEVICE HAVING A PHASE PLATE AND PARTICULAR DYE COMPOSITION

[75] Inventors: Mitsuru Kano; Takemi Akimoto, both of Furukawa, Japan

[73] Assignee: Alps Electric Co., Ltd., Tokyo, Japan

[21] Appl. No.: 440,557

[22] Filed: Nov. 22, 1989

[30] Foreign Application Priority Data

Nov. 25, 1988 [JP] Japan .................. 63-297497

[51] Int. Cl.$^5$ .............................. G02F 1/13
[52] U.S. Cl. ....................... 359/73; 359/96; 359/102
[58] Field of Search ............ 350/349, 337, 347 R, 350/350 R

[56] References Cited

U.S. PATENT DOCUMENTS

| | | | |
|---|---|---|---|
| 4,434,072 | 2/1984 | Imahori et al. | 350/349 |
| 4,497,543 | 2/1985 | Aoki et al. | 350/349 |
| 4,589,734 | 5/1986 | Needham et al. | 350/349 |
| 4,906,073 | 3/1990 | Hunahata et al. | 350/347 R |
| 4,909,606 | 3/1990 | Wada et al. | 350/335 |

OTHER PUBLICATIONS

M. Schadt and F. Leenhouts, "The Optical Mode Interference Liquid-Crystal Display", SID 87 DIGEST, (1987), pp. 372-375.

*Primary Examiner*—Rolf Hille
*Assistant Examiner*—S. V. Clark
*Attorney, Agent, or Firm*—Guy W. Shoup; B. Noël Kivlin; David W. Heid

[57] ABSTRACT

An ingenious STN type liquid crystal device having a layer of phase film and comprising a liquid crystal composition that contains a two-color pigment as additive for compensation of the color of the device per se is disclosed. Such a device has a clear black and white display effect and can be manufactured at a low cost. Moreover, since only a small amount of pigment is used as additive, the original drive characteristics, contrast and brightness of the device is not adversely affected by the pigment.

1 Claim, 2 Drawing Sheets

LIQUID CRYSTAL DEVICE HAVING A PHASE PLATE AND PARTICULAR DYE COMPOSITION

BACKGROUND OF THE INVENTION

1. Field of the Invention

This invention relates to a polymer phase plate type liquid crystal device having a layer of phase film for optical compensation.

2. Prior Art

As known twisted nematic (TN) type liquid crystal devices have disadvantages of limited viewing angle and incompatibility with multiplexing drive, there has been proposed a super-twisted nematic (STN) type liquid crystal device to overcome such problems.

Since the color of the display system of a STN type liquid crystal device has a yellowy or bluish tint, efforts have been paid to produce a black and white display system by modifying a STN type crystal device.

An achievement of such efforts is a two-layered type device. A two-layered type device is formed by combining a liquid crystal cell for display and one having an inverse twist angle for optical compensation.

While a two-layered liquid crystal device possesses excellent display characteristics, its manufacturing cost can become prohibitive because of a long process line required and a poor yield rate of production of liquid crystal cells.

With a view to overcoming these problems, there has been proposed a polymer phase plate type device that utilizes, in place of a cell for optical compensation, a phase film having optical properties which are reverse of those of the liquid crystal cell to be used for display.

However, a polymer phase plate type device is accompanied by a problem of residual background color that makes it less favorable in terms of black and white display as comprared with a two-layered type device.

It is therefore an object of the invention to solve the problem of residual background color of an existing STN type liquid crystal device.

SUMMARY OF THE INVENTION

The above and other objects of the invention are achieved by providing a polymer phase plate type liquid crystal device to which a two-color dye that compensates for the display color of the liquid crystal device per se is added.

"The display color of the liquid crystal device per se" here means the display color of a liquid crystal device in a light state to which no dye is added.

Since a polymer phase plate type device used for positive display normally remains in a light state when no voltage is applied and takes on a bluish background color, an orangy two-color dye is preferably used for compensation for a device designed for positive display. To the contrary, a bluish dye is preferably used for compensation for a device designed for negative display, since such a device normally is accompanied by a yellowish background color.

A very small amount of two-color dye will be sufficient for the purpose of the invention; normally between 0.1 and 1.5% by weight is added to the total amount of the the liquid crystal composition used in a device.

A liquid crystal device according to the invention comprising a two-color dye as an additive for color compensation typically shows an even wavelength-dependency of the transmitted light as illustrated in FIG. 1 of the accompanying drawings and therefore can offer a clear and pleasant black and white display.

Moreover, since a liquid crystal device according to the invention comprises only a very small amount of two-color dye for an effective black and white display, its drive characteristics are not affected by addition of dye.

Now the invention will be described in greater detail by referring to the accompanying drawings.

DETAILED DESCRIPTION OF THE INVENTION

The invention will be described by way of examples.

EXAMPLE 1

Figure 1:
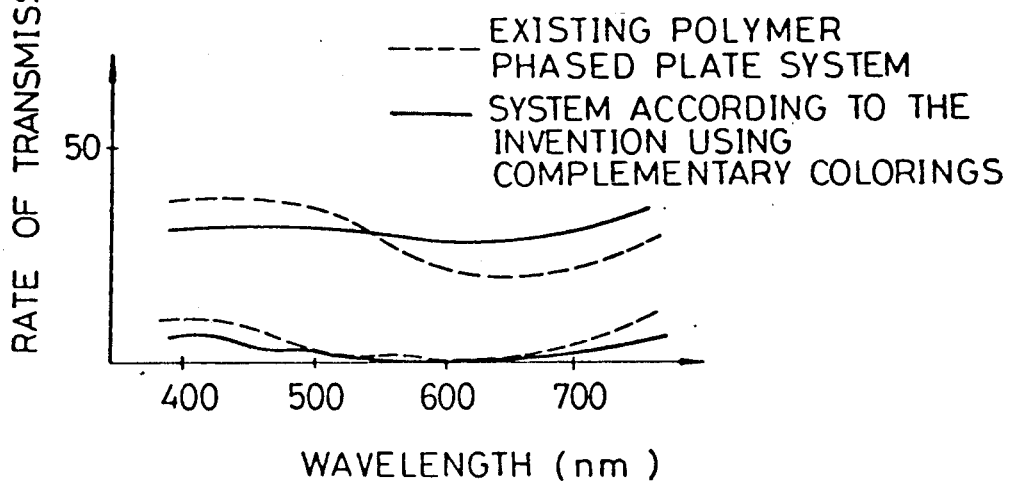
FIG. 1 is a graphic illustration of the spectral characteristics of a liquid crystal device according to the invention.
Figure 2:
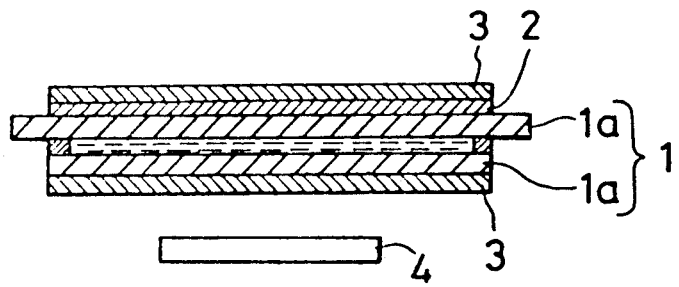
FIG. 2 is a sectional side view of an emboidment of the polymer phase plate type liquid crystal device according to the invention and having spectral characteristics as shown in FIG. 1.

A liquid crystal device having a configuration as illustrated in FIG. 2 was prepared and its spectral characteristics in terms of black and white as well as its contrast and response speed were tested.

The liquid crystal device as shown in FIG. 2 comprises a liquid crystal cell 1 and a phase plate 2 which are laminated in two layers and sandwiched by a pair of polarizing plates 3, 3. Apart from the liquid crystal device and on the side opposite to the phase plate 2 as viewed from the liquid crystal cell 1, there is provided a fluorescent light 4 as light source. A liquid crystal composition, to which a small amount of a two-color pigment is added, is sealed in the liquid crystal cell 1.

The liquid crystal device was prepared in the following manner.

Firstly an indium-tin oxide (ITO) electrode was formed on each of a pair of glass plates, which were then coated with polyimide resin (trade name SE-41110: a product of Nissan Kagaku Co., Ltd.) by offset printing. The films formed on the glass plates were then subjected to a heat treatment at 270° C. for 30 minutes for orientation. Thereafter, the oriented films were rubbed in such a manner that the liquid crystal molecules come to possess a counterclockwise twist angle of 290° C. to form a pair of substrates 1a, 1a for a liquid crystal cell 1. An epoxy bonding agent was applied to a surface of one of the substrate pair 1a, 1a by printing, and spherically shaped silica spacers were sprinkled on the printed surface. Then the two substrates 1a, 1a were bonded together to form a cell having a thickness d of 6 $\mu$m. The cell was then filled with STN type liquid crystal material with $\Delta n = 0.105$ and sealed to complete the preparation of a liquid crystal cell A for preliminary tests.

Figure 3:
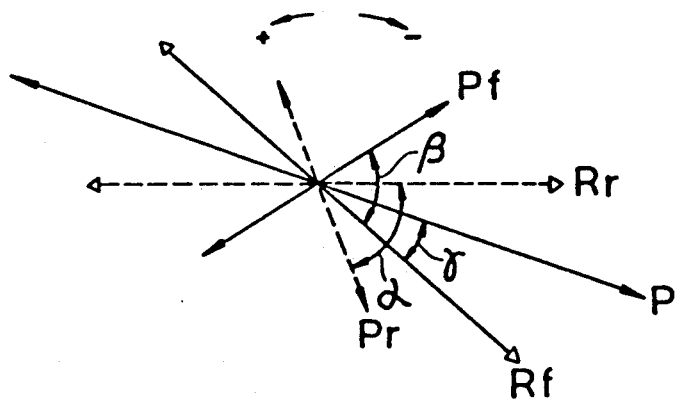
FIG. 3 is a graphic illustration showing the relative positioning of a polarizing plate and a phase plate of the embodiment of FIG. 2.

Then three pieces of film (retardation Δn·d=0.3 μm) and a pair of polarizing plates 3, 3 (trade name G122-5DU available from Nittoh Denko Co., Ltd.) to be used to form a phase plate were subjected to a series of tests by varying the number of films, angle α formed by the rear side rubbing axis Rr and the rear side polarization axis Pr, angle β formed by the front side rubbing axis Rf and the front side polarization axis Pf and angle γ formed by the optical axis P (axis of the phase plate) and the front side rubbing axis Rr (see FIG. 3) to determine the condition under which the hue, the contrast and the brightness are optimum.

As a result of the test, it was found that the use of two films (α, β, γ = −40°, −45°, 0°) brings forth an optimum effect.

Then, a liquid crystal device A having parameters as described above was prepared for preliminary tests and tested for the hue in an OFF state to find out that it bears a slightly bluish color.

An orangy dye for compensating for the bluish color was prepared by mixing the yellow dye G233 (trade name: available from Nihon Kando Shikiso Co., Ltd. λmax=460 nm) and the red dye LSR-405 (trade name: available from Mitsubishi Kasei Co., Ltd. max=520 nm) in a ratio of 1:1 by weight. The dye mixture was then added to said liquid crystal with Δn=0.105 at a ratio of 0.5% by weight to form the final liquid crystal composition. A cell having a configuration identical with that of said liquid crystal device A as illustrated in FIG. 2 was filled with the liquid crystal composition containing the orangy dye mixture to form a liquid crystal device ①.

Figure 4:
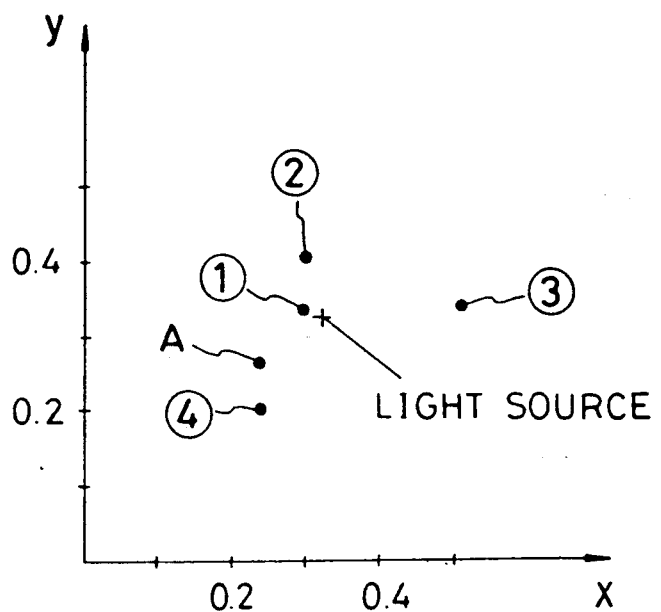
FIG. 4 is a CIE colormetric graph illustrating the display color of the embodiment of FIG. 2 in a light state.
Figure 5:
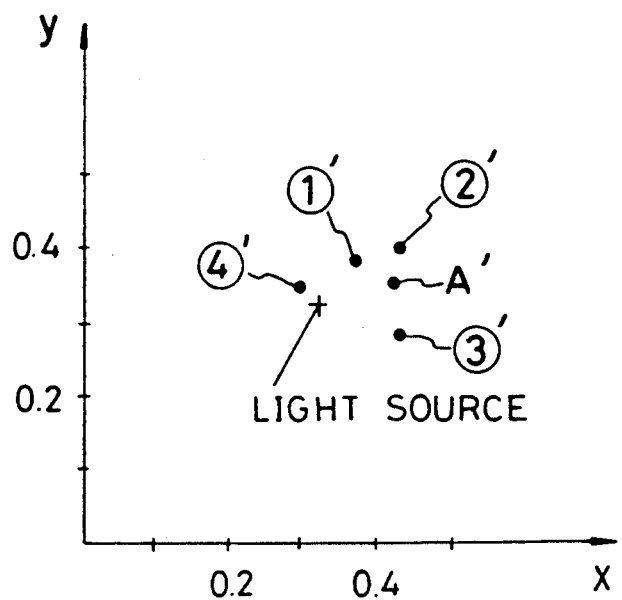
FIG. 5 is a CIE colormetric graph illustrating the display color of another embodiment in a light state.

The tint of the liquid crystal device ① was observed in an OFF state to confirm that it conforms to the hue of the light source. FIG. 4 shows a CIE spectral graph of the liquid crystal device ①. When the device ① was driven at a duty of 1/200, the contrast ratio was greater than 10 and the response speed was 100 msec, which were similar to the contrast ratio and the response speed of the liquid crystal device A to which no dye had been added.

For the purpose of comparison, a liquid crystal device ② containing 0.5% by weight of a yellowy dye (G233) as an additive, a liquid crystal device ③ containing 0.5% by weight of a reddish dye (LSR-405) as an additive, and a liquid crystal device ④ containing 0.5% by weight of a bluish dye (trade name LSB-401: available from Mitsubishi Kasei Co., Ltd.) as an additive were prepared and tested for their tints in an OFF state. FIG. 4 also shows CIE spectral graphs of these devices.

As a result of the tests, it was confirmed that the liquid crystal device ① containing an orangy two-color dye mixture as an additive for compensation of bluish color brings forth optimum effects of black and white display.

EXAMPLE 2

Liquid crystal devices 5 through 10 containing a two-color dye mixture which is identical with that of the device ① but in different ratios were prepared and tested for their optical characteristics.

The ratios of the additive in liquid crystal devices 5–10 were respectively 0.1, 0.8, 1.0, 1.5, 2.0 and 4.0% by weight.

As a results of the tests, it was determined that the devices containing the additive at ratios 0.1 to 1.5 wt % had characteristics similar to those of the liquid crystal device ① 0.5 wt % of the additive. On the other hand, the devices containing more than 2.0 wt % of the additive showed a distorted hue, an elevated response speed greater than 300 msec when driven at a duty of 1/200 and other deterioration of the characteristics.

EXAMPLE 3

A liquid crystal device A' identical with that device A of Example 1 except that α, β, γ were shifted respectively to −120°, −80°, and 0° was prepared for preliminary tests.

The liquid crystal device A' for preliminary tests carried a slightly yellowy color in an OFF state. A liquid crystal device ④' containing a bluish dye LSB 401 as an additive for compensation of the yellowy color brought forth an optimum effect of black and white display. The contrast ratio of the liquid crystal device ④' was 9 and the response speed was 200 msec when driven at a duty of 1/200, which were the same as those of the device A' containing no dye.

EXAMPLE 4

A series of tests similar to those of Examples 1 through 3 were conducted with devices having twist angles respectively shifted to 180°, 225° and 260° to find out that the performance of the devices of this example was approximately same as that of the device having a twist angle of 290° as described above.

EXAMPLE 5

Cells which were different from that of Example 1 only in that their thicknesses were 7 μm were prepared and filled with STN type liquid crystal materials having Δn values of 0.112, 0.120 and 0.130 to form liquid crystal cells B, C, and D respectively for preliminary tests. The values of retardation of the cells B, C and D were respectively approximately 0.8 μm, 0.85 μm and 0.9 μm.

Then a number of pairs of polarizing plates 3, 3 (trade name G1225DU: available from Nittoh Denko Co., Ltd.) and pieces of film having retardation values of 0.3 μm and 0.4 μm were prepared to form phase plates 2 by varying the number of component films and the magnitude of the angles (α, β, γ) to produce devices with optimum hue, contrast and brightness. The number of films needed to bring forth an optimum performance of each of the cells B, C and D is shown in Table 1 below.

All the liquid crystal devices B, C and D for preliminary tests as described above displayed bluish color in a light state.

TABLE 1

| liquid crystal cell | Δn · d of film | number of films |
|---|---|---|
| B | 0.4 μm | 2 |
| C | " | " |
| D | 0.3 μm | 3 |

An orangy mixed dye of G233/LSR-405 in a ratio 1/1 (by weight) was prepared and added to the above described liquid crystals in the amount by 0.5 wt % and the resultant liquid crystal compositions were respectively injected into liquid crystal devices having a configuration identical with that of the devices B through D to form liquid crystal devices 11 through 13.

The hues of the liquid crystal devices 11 through 13 were observed in an OFF state to find out that each of them carries a significantly improved white color which is similar to the color of the light source.

EXAMPLE 6

A yellowy dye of LSY-010 (trade name: available from Mitsubishi Kasei Co., Ltd. λmax=440 nm), a bluish dye of LMB 038 (trade name: available from Mitsubishi Kasei Co., Ltd. λmax=590 nm) and orangy mixed dye of LSY-010/LSR-405 in a ratio 1/1 by weight and G233/LSR-405 in a ratio 2/1 by weight were used to conduct a series of tests similar those of Examples 1 through 5.

As a result of the tests, it was confirmed that the hues of the liquid crystal devices for preliminary tests were significantly improved toward black and white display in the devices containing a dye that effectively compensates for the hues of the devices per se.

EXAMPLE 7

A number of liquid crystal devices having a configuration similar to that of the device A for preliminary tests were prepared and each of them was filled with a different liquid crystal composition containing an orangy mixed dye as an additive and sealed to see its performance for black and white display.

Five different mixed dye of G233 (yellow)/LSR-405(red) in the weight ratios 3/1, 2/1, 1/1, 1/2 and 1/3 were used.

As a result, it was found that mixed dyes with ratios between 2/1 and 1/2 and particularly a dye of 1/1 could significantly improve the black and white display performance of the device. A dye with the ratio of 3/1 produced a strongly yellowy display color, while a dye with the ratio of 1/3 brought forth a very reddish color such that no improvement of the performance of the device was observed.

As is apparent from the above description, according to the invention there is provided a polymer phase plate type liquid crystal device comprising a liquid crystal composition that contains a two-color dye for compensation of the color of the device per se to ensure an even frequncy dependency of display in a light state.

Such a polymer phase plate type liquid crystal device can be manufactured at a low cost and shows a good performance for black and white display.

Moreover, since a liquid crystal device according to the invention contains only a small amount of dye as an additive, its orginal drive characteristics, contrast and brightness of display are not affected and there is no possibility of precipitation of the dye.

What is claimed is:

1. A liquid crystal device comprising:
   a liquid crystal cell containing a liquid crystal composition with a twist angle of 180° to 300°;
   a linear polarizing plate having a polarization axis disposed on each side of liquid crystal cell; and
   a phase plate disposed between said liquid crystal cell and said polarization axis of said linear polarizing plate, wherein said liquid crystal composition contains 0.1 to 1.5 percent by weight of a dye, said dye compensating for display color of said liquid crystal device with no dye added.

* * * * *